US012533894B2

(12) United States Patent
Kosugi

(10) Patent No.: US 12,533,894 B2
(45) Date of Patent: Jan. 27, 2026

(54) IMAGE FORMING APPARATUS AND RECORDING MEDIUM

(71) Applicant: Konica Minolta, Inc., Tokyo (JP)

(72) Inventor: Akira Kosugi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/748,842

(22) Filed: Jun. 20, 2024

(65) Prior Publication Data

US 2024/0424812 A1 Dec. 26, 2024

(30) Foreign Application Priority Data

Jun. 26, 2023 (JP) ................................ 2023-103954

(51) Int. Cl.
*B41J 11/00* (2006.01)
*B41J 3/60* (2006.01)
(Continued)

(52) U.S. Cl.
CPC ............. *B41J 11/0085* (2013.01); *B41J 3/60* (2013.01); *B41J 11/057* (2013.01); *B65H 5/222* (2013.01);
(Continued)

(58) Field of Classification Search
CPC ............ B65H 2801/06; B65H 2220/01; B65H 2220/02; G03G 15/657; G03G 15/6529
See application file for complete search history.

(56) References Cited

U.S. PATENT DOCUMENTS

2019/0283992 A1 9/2019 Maeyama
2020/0239257 A1 7/2020 Ogawa
(Continued)

FOREIGN PATENT DOCUMENTS

JP 2006-027850 A 2/2006
JP 2010-105350 A 5/2010
(Continued)

OTHER PUBLICATIONS

European Patent Office, "Extended European Search Report", dated Nov. 26, 2024, issued for the corresponding European patent application No. 24181842.6, 13 pages.

*Primary Examiner* — Jessica L Eley
(74) *Attorney, Agent, or Firm* — LUCAS & MERCANTI, LLP

(57) ABSTRACT

Disclosed is an image forming apparatus including a conveyance section, an attraction section, an image forming section, and a hardware processor. The conveyance section includes conveyance surfaces on each of which a sheet can be placed and that conveys the sheet placed thereon. The attraction section that attracts the sheet onto the conveyance surfaces by sucking air from suction holes. The image forming section forms an image on the sheet. When a decrease of an attraction force by the attraction section is caused in executing a print job, the hardware processor causes one or more of the conveyance surfaces to suck and convey a non-print job sheet and then causes the one or more of the conveyance surfaces to consecutively suck and convey a print job sheet, and does not perform image formation on the non-print job sheet and performs the image formation on the print job sheet.

15 Claims, 12 Drawing Sheets

| CONVEYANCE SURFACE | SURFACE A | SURFACE B | SURFACE C | SURFACE A | SURFACE B | SURFACE C | SURFACE A | SURFACE B | SURFACE C | ... |
|---|---|---|---|---|---|---|---|---|---|---|
| SHEET | NON-PRINT | NON-PRINT | PRINT: 1ST SHEET | PRINT: 2ND SHEET | PRINT: 3RD SHEET | PRINT: 4TH SHEET | PRINT: 5TH SHEET | PRINT: 6TH SHEET | PRINT: 7TH SHEET | ... |

(51) Int. Cl.

| | |
|---|---|
| ***B41J 11/057*** | (2006.01) |
| ***B65H 5/22*** | (2006.01) |
| ***B65H 7/16*** | (2006.01) |
| ***B65H 85/00*** | (2006.01) |
| ***G03G 15/00*** | (2006.01) |

(52) U.S. Cl.

CPC ............... *B65H 7/16* (2013.01); *B65H 85/00* (2013.01); *G03G 15/6555* (2013.01); *B65H 2301/44336* (2013.01); *B65H 2301/5111* (2013.01); *B65H 2406/365* (2013.01)

(56) References Cited

U.S. PATENT DOCUMENTS

| | | | | |
|---|---|---|---|---|
| 2022/0234373 | A1* | 7/2022 | Ogasahara | B41J 13/0018 |
| 2022/0314649 | A1* | 10/2022 | Baker | B65H 5/224 |
| 2022/0314664 | A1* | 10/2022 | Hunter | B65H 5/224 |

FOREIGN PATENT DOCUMENTS

| | | | |
|---|---|---|---|
| JP | 2017-007865 | A | 1/2017 |
| JP | 2019-116019 | A | 7/2019 |

* cited by examiner

FIG.5

| CONVEYANCE SURFACE | SURFACE A | SURFACE B | SURFACE C | SURFACE A | SURFACE B | SURFACE C | SURFACE A | SURFACE B | SURFACE C | … |
|---|---|---|---|---|---|---|---|---|---|---|
| SHEET | NON-PRINT | NON-PRINT | PRINT: 1ST SHEET | PRINT: 2ND SHEET | PRINT: 3RD SHEET | PRINT: 4TH SHEET | PRINT: 5TH SHEET | PRINT: 6TH SHEET | PRINT: 7TH SHEET | … |

FIG.6A

| CONVEYANCE SURFACE | SURFACE A | SURFACE B | SURFACE C | SURFACE A | SURFACE B | SURFACE C | SURFACE A | ... |
|---|---|---|---|---|---|---|---|---|
| SHEET | PRINT: 1ST SHEET (1ST SURFACE) | EMPTY | PRINT: 2ND SHEET (1ST SURFACE) | EMPTY | PRINT: 3RD SHEET (1ST SURFACE) | PRINT: 1ST SHEET (2ND SURFACE) | PRINT: 4TH SHEET (1ST SURFACE) | ... |
| SUCTION PRESSURE | A1 | A2 | A3 | A4 | A5 | A6 | A7 | |

FIG.6B

| CONVEYANCE SURFACE | | | | | | | | | |
|---|---|---|---|---|---|---|---|---|---|
| SHEET | … | PRINT: (N−1)TH SHEET (1ST SURFACE) | PRINT: (N−3)TH SHEET (2ND SURFACE) | PRINT: NTH SHEET (1ST SURFACE) | PRINT: (N−2)TH SHEET (2ND SURFACE) | EMPTY | PRINT: (N−1)TH SHEET (2ND SURFACE) | EMPTY | PRINT: NTH SHEET (2ND SURFACE) |
| SUCTION PRESSURE | … | A8 | A9 | A10 | A11 | A12 | A13 | A14 | A15 |

FIG.7A

| CONVEYANCE SURFACE | SURFACE A | SURFACE B | SURFACE C | SURFACE A | SURFACE B | SURFACE C | SURFACE A | SURFACE B | SURFACE C | SURFACE A | SURFACE B | SURFACE C | SURFACE A | … |
|---|---|---|---|---|---|---|---|---|---|---|---|---|---|---|
| SHEET | NON-PRINT: 1ST SHEET (1ST SURFACE) | EMPTY | NON-PRINT: 2ND SHEET (1ST SURFACE) | EMPTY | NON-PRINT: 3RD SHEET (1ST SURFACE) | NON-PRINT: 1ST SHEET (2ND SURFACE) | PRINT: 1ST SHEET (1ST SURFACE) | NON-PRINT: 2ND SHEET (2ND SURFACE) | PRINT: 2ND SHEET (1ST SURFACE) | NON-PRINT: 3RD SHEET (2ND SURFACE) | PRINT: 3RD SHEET (1ST SURFACE) | PRINT: 1ST SHEET (2ND SURFACE) | PRINT: 4TH SHEET (1ST SURFACE) | … |
| SUCTION PRESSURE | B1 | B2 | B3 | B4 | B5 | B6 | B7 | B8 | B9 | B10 | B11 | B12 | B13 | … |

FIG.7B

| CONVEYANCE SURFACE | ... | | | | | | | | | | |
|---|---|---|---|---|---|---|---|---|---|---|---|
| SHEET | ... | PRINT: NTH SHEET (1ST SURFACE) | PRINT: (N-2)TH SHEET (2ND SURFACE) | NON-PRINT: 4TH SHEET (1ST SURFACE) | PRINT: (N-1)TH SHEET (2ND SURFACE) | NON-PRINT: 5TH SHEET (1ST SURFACE) | PRINT: NTH SHEET (2ND SURFACE) | EMPTY | NON-PRINT: 4TH SHEET (2ND SURFACE) | EMPTY | NON-PRINT: 5TH SHEET (2ND SURFACE) |
| SUCTION PRESSURE | ... | B14 | B15 | B16 | B17 | B18 | B19 | B20 | B21 | B22 | B23 |

FIG.8A

| CONVEYANCE SURFACE | SURFACE A | SURFACE B | SURFACE C | SURFACE A | SURFACE B | SURFACE C | SURFACE A | SURFACE B | SURFACE C | SURFACE A | SURFACE B | ... |
|---|---|---|---|---|---|---|---|---|---|---|---|---|
| SHEET | NON-PRINT: 1ST SHEET | NON-PRINT: 2ND SHEET | PRINT: 1ST SHEET (1ST SURFACE) | NON-PRINT: 3RD SHEET | PRINT: 2ND SHEET (1ST SURFACE) | NON-PRINT: 4TH SHEET | PRINT: 3RD SHEET (1ST SURFACE) | PRINT: 1ST SHEET (2ND SURFACE) | PRINT: 4TH SHEET (1ST SURFACE) | PRINT: 2ND SHEET (2ND SURFACE) | PRINT: 5TH SHEET (1ST SURFACE) | ... |

FIG.8B

| CONVEYANCE SURFACE | ⋯ | | | | | | |
|---|---|---|---|---|---|---|---|
| SHEET | ⋯ | PRINT: NTH SHEET (1ST SURFACE) | PRINT: (N−2)TH SHEET (2ND SURFACE) | NON-PRINT: 5TH SHEET | PRINT: (N−1)TH SHEET (2ND SURFACE) | NON-PRINT: 6TH SHEET | PRINT: NTH SHEET (2ND SURFACE) |

IMAGE FORMING APPARATUS AND RECORDING MEDIUM

CROSS-REFERENCE TO RELATED APPLICATIONS

The entire disclosure of Japanese Patent Application No. 2023-103954, filed on Jun. 26, 2023, including description, claims, drawings and abstract is incorporated herein by reference.

BACKGROUND OF THE INVENTION

Technical Field

The present invention relates to an image forming apparatus and a recording medium.

Description of Related Art

Conventionally, there has been known an image forming apparatus that forms an image on a sheet conveyed by a conveyance section. The conveyance section conveys the sheet by rotating the rotating body while suctioning air from a conveyance surface of the front surface and attracting the sheet to the conveyance surface.

When the attraction force of the conveyance surface is weak, lifting of the sheet occurs, resulting in sheet conveyance failure or printing failure. If the attraction force of the conveyance surface is strong, the sheet is sucked to the attraction holes of the conveyance surface and is deformed. Therefore, it is necessary that the conveyance section perform control such that the conveyance surface has an appropriate attraction force corresponding to the sheet to be conveyed.

Therefore, for example, Japanese Unexamined Patent Publication No. 2017-007865 describes a configuration of a conveyance surface that can be moved and deformed according to the size of sheets to be placed. Furthermore, Patent Literature 1 describes a configuration in which a plurality of conveyance surfaces and a plurality of negative pressure sources are connected to each other by a plurality of air pipes. According to the above configuration, the sheets can be attracted with an appropriate attraction force corresponding to the sheets to be conveyed.

However, in order to use larger sized sheets, it is necessary to widen the attraction section and the air pipe. Then, a negative pressure is formed in the air pipe. Then, it takes time for the conveying surface to have a sufficient suction force. As a result, printing failure due to attraction failure occurs, in particular, at the start of printing or the like.

SUMMARY OF THE INVENTION

The present invention has been made in view of such circumstances. An object of the present invention is to provide an image forming apparatus and a computer-readable recording medium storing a program, which are capable of suppressing printing failure due to failure in attraction of a sheet. To achieve at least one of the abovementioned objects, according to an aspect of the present invention, an image forming apparatus reflecting one aspect of the present invention include:

- a conveyance section that includes a plurality of conveyance surfaces on each of which a sheet can be placed and that conveys the sheet placed on the conveyance surfaces;
- an attraction section that attracts the sheet onto each of the conveyance surfaces by sucking air from a plurality of suction holes formed in each of the conveyance surfaces;
- an image forming section that forms an image on the sheet attracted and conveyed;
- a hardware processor that: when a predetermined condition causing a decrease of an attraction force by the attraction section is satisfied in executing a print job, causes one or more of the conveyance surfaces to suck and convey a non-print job sheet and then causes the one or more of the conveyance surfaces to consecutively suck and convey a print job sheet; and
- does not perform image formation of the print job on the non-print job sheet and performs the image formation of the print job on the print job sheet.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 5 is a table listing sheets to be placed on each conveyance surface from the start of single-sided printing in the image forming apparatus according to the present embodiment;

FIG. 6A is a table listing sheets to be placed on each conveyance surface from the start of double-sided printing in a conventional image forming apparatus;

FIG. 6B is a table listing sheets to be conveyed before the end of double-sided printing in a conventional image forming apparatus;

FIG. 7A is a table listing sheets to be placed on each conveyance surface from the start of double-sided printing in the image forming apparatus according to the present embodiment;

FIG. 7B is a table listing sheets to be conveyed before the end of double-sided printing in the image forming apparatus according to the present embodiment;

FIG. 8A is a table listing sheets to be placed on each conveyance plane from the start of double-sided printing in an image forming apparatus according to another embodiment; and FIG. 8B is a table listing sheets to be conveyed before the end of double-sided printing in an image forming apparatus according to another embodiment.

DETAILED DESCRIPTION

Figure 1:
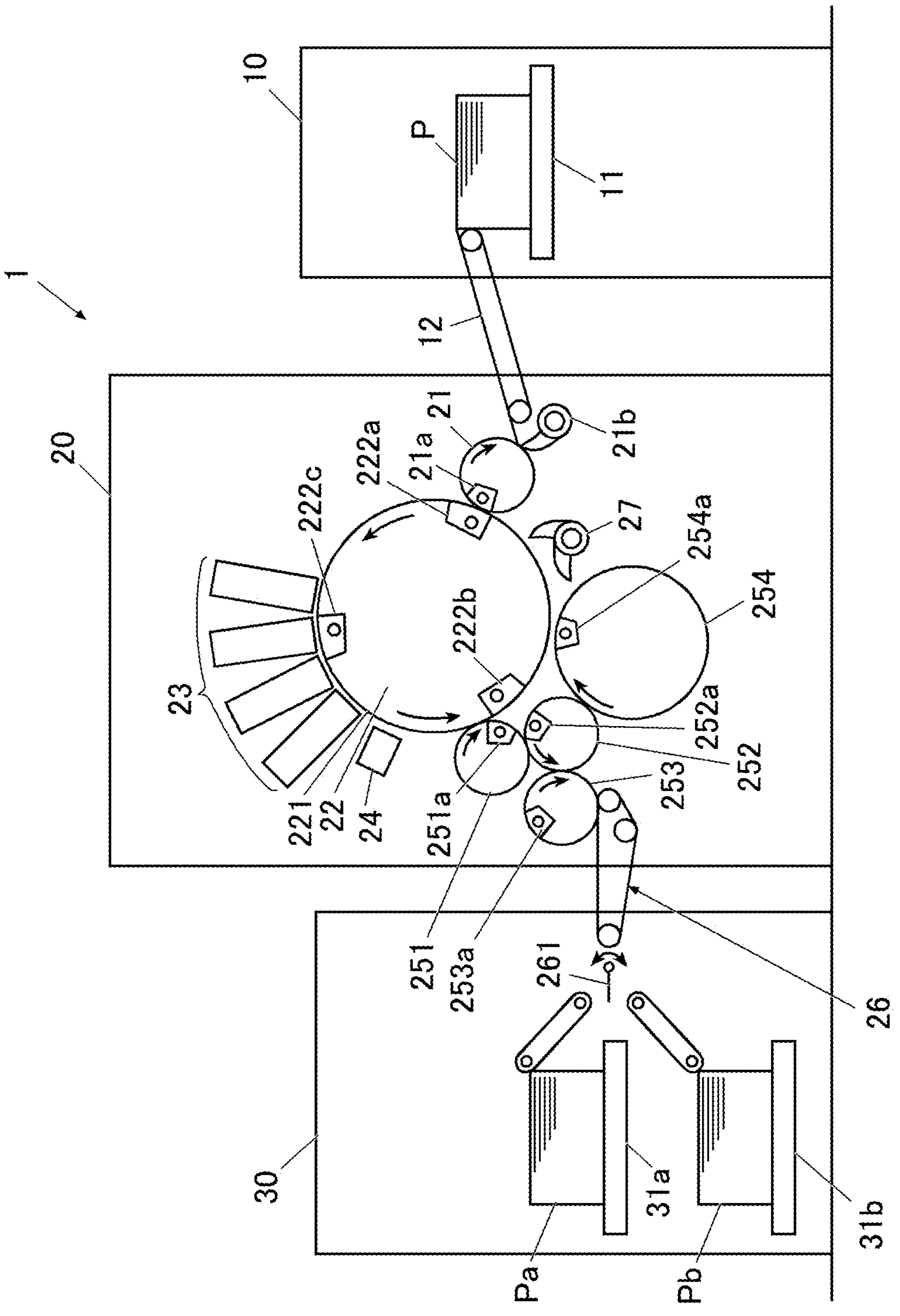
FIG. 1 is a schematic lateral sectional view of components constituting the image forming apparatus.

Hereinafter, an image forming apparatus according to an embodiment of the present invention will be described in detail with reference to the drawings. However, the scope of the present invention is not limited to the disclosed embodiments. In the following description, components having the same functions and configurations are denoted by the same reference numerals, and the description thereof will be omitted.

[Overall Configuration of Image Forming Apparatus]

Figure 2:
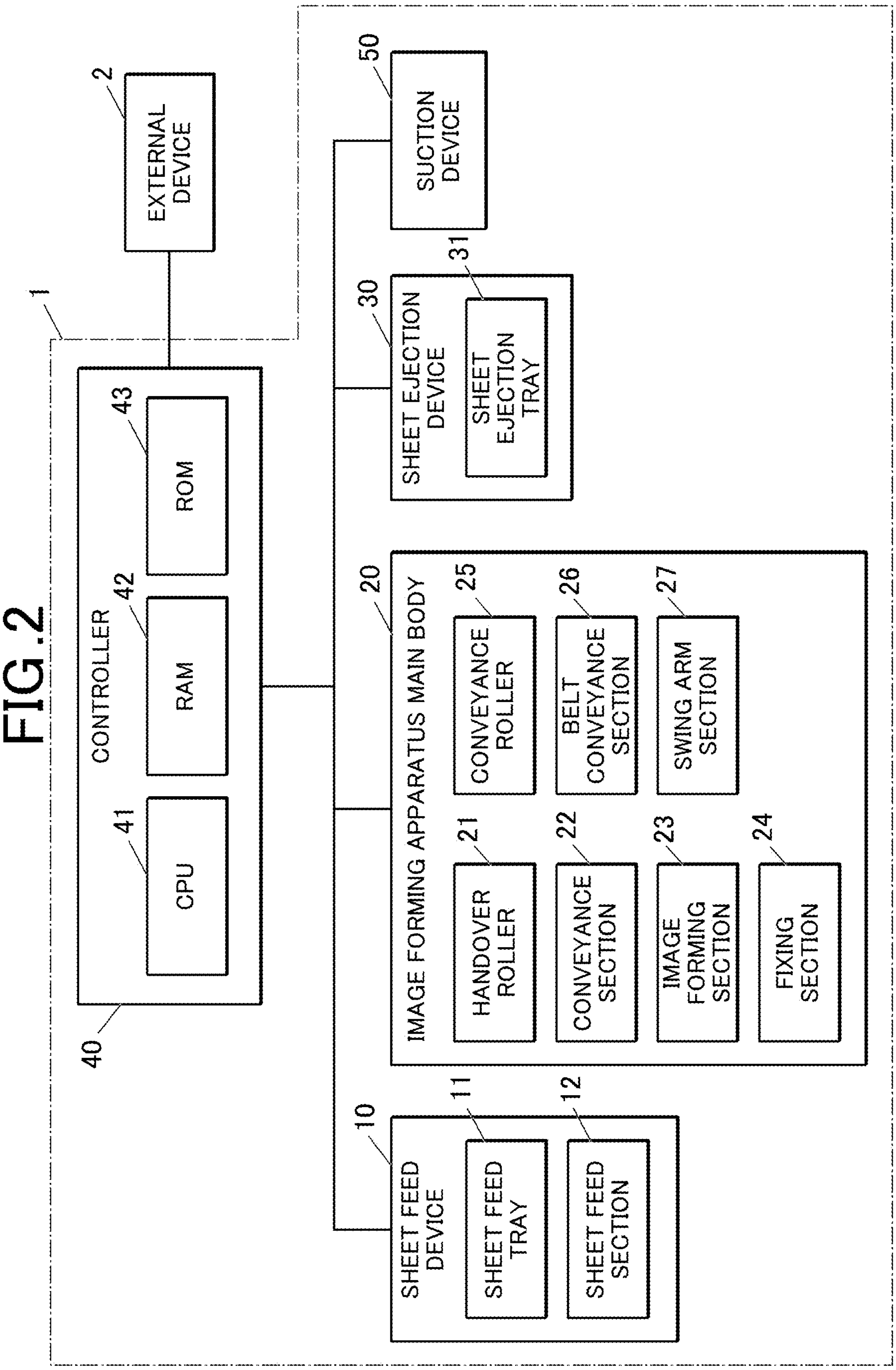
FIG. 2 is a block diagram of the image forming apparatus according to the present embodiment.

FIG. 1 is a diagram illustrating an example of a schematic configuration of an image forming apparatus 1. FIG. 2 is a block diagram illustrating a functional configuration of the image forming apparatus 1. The image forming apparatus 1 includes a sheet feed device 10, an image forming apparatus main body 20, a sheet ejection device 30, a controller 40 (a hardware processor), and a suction device 50.

(Sheet Feed Device)

The sheet feed device 10 includes a sheet feed tray 11 and a sheet feed section 12. The sheet feed tray 11 stores sheets P. The sheet feed section 12 includes rollers and a belt. The belt has a loop shape. The inner side of the belt is supported by two rollers. The sheet feed section 12 conveys a sheet P by rotating two rollers in a state where the sheet P is placed on the belt.

(Image Forming Apparatus)

The image forming apparatus main body 20 includes a handover roller 21, a conveyance section 22, an image forming section 23, a fixing section 24, a conveyance roller 25, a belt conveyance section 26, and a swing arm section 27.

{Handover Roller}

The handover roller 21 is provided between the sheet feed section 12 and the conveyance section 22 of the sheet feed device 10. The handover roller 21 includes a claw 21*a*. The claw 21*a* is switched between an open state and a closed state by the control of the controller 40. The claw 21*a* enable the handover roller 21 to hold the sheet P on the conveyance surface thereof.

The handover roller 21 hands over the sheet P conveyed by the sheet feed section 12 of the sheet feed device 10 to the conveyance section 22. Specifically, the handover roller 21 holds and picks up the first end of the sheet P conveyed from the sheet feed section 12 with the swing arm section 21*b*, and holds the first end with the claw 21*a*. The handover roller 21 rotates in a clockwise direction indicated by an arrow in FIG. 1, and delvers the sheet P to one of the claws 222*a* to 222*c* of the conveyance section 22.

{Conveyance Section}

The conveyance section 22 includes a plurality of conveyance surfaces 221 on an outer peripheral surface. One sheet P is placed on the conveyance surface 221. The conveyance section 22 conveys the sheet P conveyed from the handover roller 21 in a conveyance direction indicated by an arrow in FIG. 1. In the present embodiment, the conveyance section 22 is a conveyance drum in a substantially columnar shape with a large diameter.

In the present embodiment, a case where the conveyance unit 22 is a three-fold conveyance drum is exemplified. "Three-fold" means that the perimeter of the conveying section 22 is long enough to hold three sheets P at a time, the sheets P having a maximum length usable in the image forming apparatus 1. That is, in the present embodiment, the conveyance section 22 includes three conveyance surfaces 221. In the following description, the three conveyance surfaces 221 are referred to as a surface A 221*a*, a surface B 221*b*, and a surface C 221*c* (see FIG. 3).

Note that the conveyance section 22 is not limited to a three-fold conveyance drum. The conveyance section 22 may be, for example, a four-fold or five-fold conveyance drum.

Furthermore, the conveyance section 22 is connected to a conveyance drum motor (not illustrated). The controller 40 rotationally drives the conveyance drum motor to rotate the conveyance section 22 by an angle proportional to the amount of rotation. Under the control of the controller 40, the conveyance section 22 conveys the sheet P in the conveyance direction while causing the sheet P to face the image forming section 23.

Furthermore, the conveyance section 22 includes the claws 222*a* to 222*c* and an attraction section 223 (see FIG. 4) in order to hold the sheet P on the conveyance surface 221.

<Claws>

The claws 222*a* to 222*c* are arranged on the surface A 221*a*, the surface B 221*b*, and the surface C 221*c*, respectively, at intervals equal to the circumferential lengths of the handover roller 21 and the conveyance roller 25. The open/closed states of the claw portions 222*a* to 222*c* are switched under the control of the controller 40. In the closed state, the claw portions 222*a* to 222*c* press the first end of the sheet P which is delivered from the handover roller 21 or the swing arm section 27, with a predetermined pressing force to hold the sheet P on the conveyance surfaces 221. Furthermore, in the open state, the claws 222*a* to 222*c* are released from the above-described pressed state and deliver the sheet P held on the conveyance surfaces 221 to the conveyance roller 25.

<Attraction Section>

The attraction section 223 attracts the sheet P onto the conveyance surface 221 by forming a suction pressure to suck air from the conveyance surface 221 into the conveyance section 22.

Figure 3:
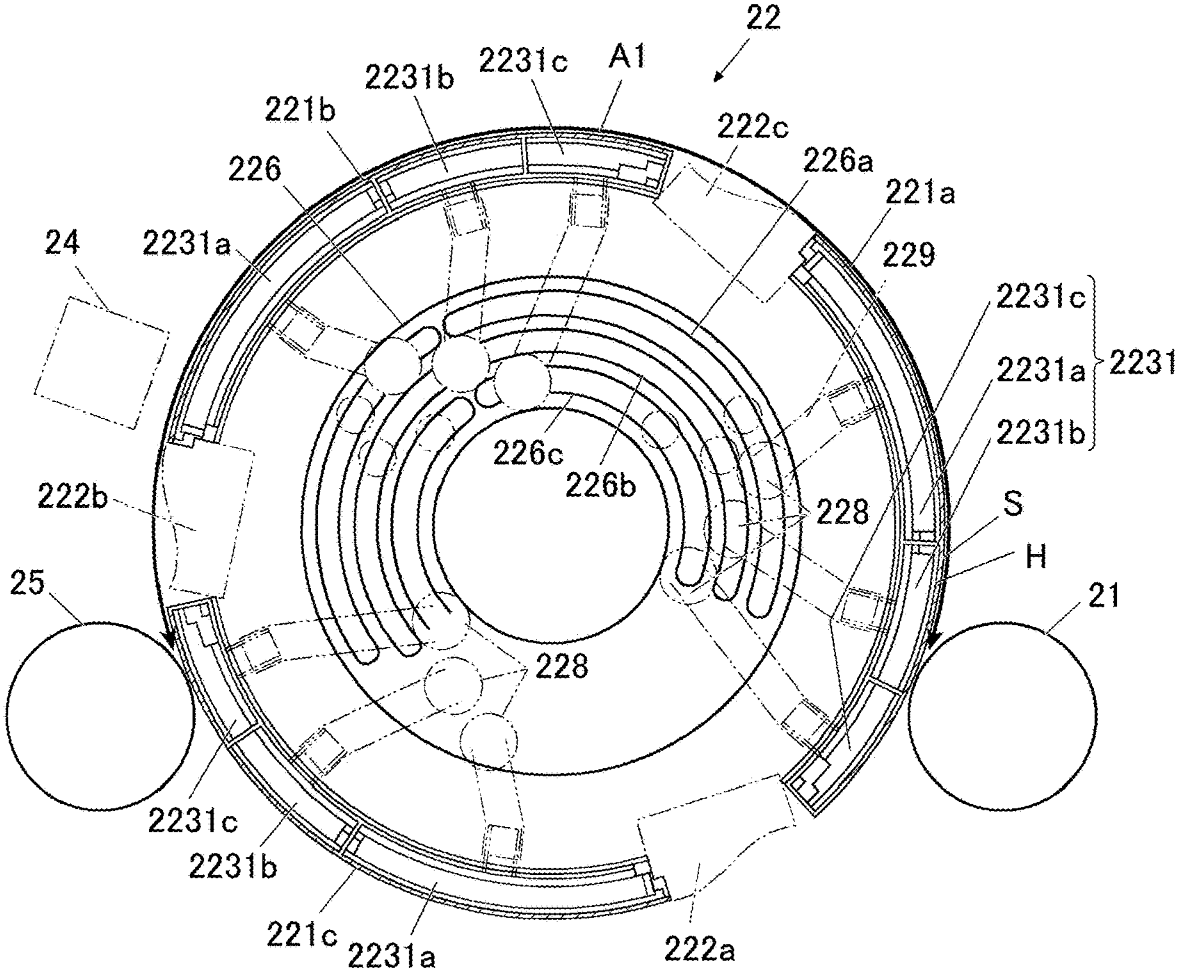
FIG. 3 is a diagram illustrating a configuration of an inside and a periphery of a conveyance section according to the present embodiment.
Figure 4:
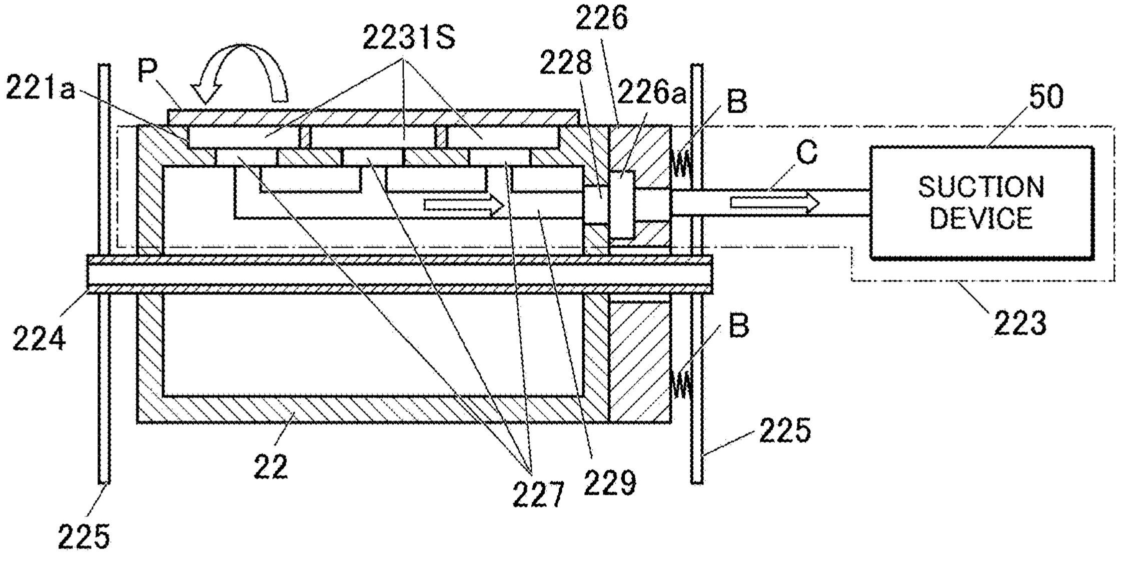
FIG. 4 is a diagram illustrating a configuration of an attraction section according to the present embodiment.

FIG. 3 is a diagram for explaining the configuration of the inside and the periphery of the conveyance section 22. FIG. 4 is a diagram for explaining the configuration of the attraction section 223. As shown in FIG. 3, the inside of the conveyance section 22 has a hollow structure. Furthermore, chambers 2231 are formed below (on the inner side of) the surface A 221*a* to the surface C 221*c*, respectively. In addition, a sheet S forming an outer surface of the chamber 2231 is disposed on each of the conveyance surfaces 221. A plurality of suction holes H are formed in the sheet S.

A plurality of chambers 2231 (three chambers 2231*a*, 2231*b*, and 2231*c* in the present embodiment) are arranged between the two claws 222 and 222 of the conveyance section 22. As shown in FIG. 4, each of the chambers 2231 is further divided into a plurality of small chambers 2231S in the longitudinal direction of the rotary shaft 224. A communication hole 227 is provided in the bottom surface of each of the small chambers 2231S.

Further, as shown in FIG. 4, side plates 225, 225 for holding the rotary shaft 224 of the conveyance section 22 are provided on the front side and the rear side of the conveyance section 22. Further, a substantially ring-shaped suction control plate 226 is configured not to rotate between the side plate 225 on the back side and the conveyance section 22. Specifically, for example, as shown in FIG. 4, the suction control plate 226 is biased toward the conveyance section 22 by a spring B provided between the suction control plate 226 and the side plate 225.

Openings 226*a* to 226*c* corresponding to the chambers 2231*a* to 2231*c*, respectively, are provided in a surface of the suction control plate 226 facing the conveyance section 22.

The openings 226*a* to 226*c* are arc-shaped grooves. The openings 226*a* to 226*c* are provided in a plurality of rows corresponding to the chambers 2231 in number. The openings 226*a* to 226*c* are provided in the suction control plate 226 at positions corresponding to a suction region A1 where the sheet P is sucked by the suction device 50. A first end of a communication portion C is fixed to each of the openings 226*a* to 226*c*. A second end of the communication portion C is fixed to the suction device 50. The suction device 50 is a known blower including a fan and a motor, and therefore, detailed description thereof is omitted. The communication portion C is, for example, a tube.

In addition, a connection hole 228 which communicates with the openings 226*a* to 226*c* is provided on the surface of the conveyance section 22 which faces the suction control plate 226. Inside the conveyance section 22, a tube 229 is provided which has a plurality of channels and which allows the connection hole 228 and the plurality of communication holes 227 to communicate with each other. A known electromagnetic valve (not illustrated) is provided in each channel connected to the plurality of communication holes 227 in the tube 229. Under the control of the controller 40, the electromagnetic valves individually opens and closes the channel to each of the small chambers 2231S or adjust the opening degree of the channel.

With the above-described configuration, an air channel is formed by the opening 226*a* of the suction control plate 226, and the communication holes 227, the connection hole 228, and the tube 229 of the conveyance section 22 in the suction region A1. The attraction section 223 includes the air channel and the suction device 50 connected to the air channel by the communication portion C. The suction device 50 forms a negative pressure in the chamber 2231, the upper surface of which is covered with the sheet P, via the air channel. As a result, the sheet P is attracted to and held by the conveyance surface 221 having the plurality of suction holes H.

In addition, it is possible to appropriately adjust the range of the conveyance surface 221 in which the suction pressure is generated according to the size of the sheet P by the opening and closing control of the electromagnetic valve by the controller 40.

{Image Forming Section}

Back in FIG. 1, the image forming section 23 forms an image on the sheet P conveyed by the conveyance section 22. In the present embodiment, the image forming section 23 includes a plurality of head units formed of, for example, a plurality of inkjet heads. Each head unit ejects ink of corresponding color from nozzle openings facing the conveyance surface 221 at appropriate timings corresponding to the rotation of the conveyance section 22 to form an image. The head unit is disposed such that the nozzle openings and the conveyance surface 221 are separated from each other by a predetermined distance.

{Fixing Section}

The fixing section 24 fixes the image formed on the sheet P by the image forming section 23. The fixing section 24 is, for example, an energy ray irradiation section. The fixing section 24 includes a light emitting unit arranged over the width of the conveyance section 22 in the orthogonal direction. The light emitting unit emits energy beams, such as ultraviolet rays, onto the conveyed sheet P under the control of the controller 40. The ink on the sheet P is thereby cured and fixed.

{Conveyance Roller}

The conveyance roller 25 receives the sheet P, which has passed through the image forming section 23 and the fixing section 24, from the conveyance section 22 and conveys the sheet P. As shown in FIG. 1, the conveyance roller 25 has, for example, a first conveyance roller 251, a second conveyance roller 252, a third conveyance roller 253, and a fourth conveyance roller 254.

The first conveyance roller 251 is provided in such a manner as to face the conveyance section 22. The second conveyance roller 252 is provided in such a manner as to face the first conveyance roller 251. The third conveyance roller 253 and the fourth conveyance roller 254 are provided in such a manner as to face the second conveyance roller 252. The first conveyance roller 251, the third conveyance roller 253, and the fourth conveyance roller 254 among those conveyance rollers rotate in a direction opposite to the conveyance direction. The second conveyance roller 252 rotates in the conveyance direction.

The first to fourth conveyance rollers 251 to 254 include the claws 251*a* to 254*a*, respectively. The claws 251*a* to 254*a* open and close under the control of the controller 40. Specifically, the controller 40 brings the claws 251*a* to 253*a* into the open state at a timing at which the sheet P is conveyed to the second to fourth conveyance rollers 242 to 254 on the downstream side, thereby delivering the first end of the sheet P to the claws 252*a* to 254*a*. Furthermore, the controller 40 brings the claws 252*a* to 254*a* into the closed state at a timing at which the first end of the sheet P is delivered from the claws 251*a* to 253*a* on the upstream side. Through this control, the claws 252*a* to 254*a* hold the first end of the sheet P.

{Belt Conveyance Section}

The belt conveyance section 26 is provided in such a manner as to face the third conveyance roller 253. The belt conveyance section 26 includes a ring-shaped conveyance belt. The conveyance belt is supported by a plurality of rollers on its inner side. The belt conveyance section 26 includes, on the downstream side in the conveyance direction, a branch portion 261 that is rotatable by a predetermined angle. The controller 40 controls the branch portion 261 to convey a print job sheet Pa, which will be described later, delivered from the third conveyance roller 253 to a first sheet ejection tray 31*a*, which will be described later. Alternatively, the controller 40 controls the branch portion 261 to convey a non-print job sheet Pb delivered from the third conveyance roller 253, which will be described later, to a second sheet ejection tray 31*b*, which will be described later.

{Swing Arm Section}

The swing arm section 27 is provided on the downstream side of the fourth conveyance roller 254. In a case where the image forming apparatus 1 performs double-sided printing, the sheet P is returned to the conveyance section 22 by the fourth conveyance roller 254 and the swing arm section 27 while the first surface and the second surface of the sheet P are reversed.

Specifically, when the image formation on the first surface of the sheet P is completed, the controller 40 sequentially delivers the first end of the sheet P to the first conveyance roller 251, the second conveyance roller 252, and the fourth conveyance roller 254. When the second end of the sheet P reaches a position facing the swing arm section 27, the controller 40 delivers the sheet P from the fourth conveyance roller 254 to the swing arm section 27. Next, when any one of the conveyance surfaces 221 reaches the position facing the swing arm section 27, the controller 40 delivers the sheet P to the conveyance section 22.

In this way, the conveyance roller 25 functions as a flipping section that reverses the front and back of the sheet P that has passed through the image forming section 23. Furthermore, the swing arm section 27 functions as a circulation section that returns the sheet P flipped by the flipping section to the conveyance section 22.

Note that the image forming apparatus main body 20 according to the present invention executes so-called alternate circulation control when forming images on both the first side and the second side of the sheet P. The alternate circulation control is control in which the image formation on the second sheet P is interposed between the image formations on the first surface and the second surface of the first sheet P. When the image forming apparatus 1 adopts the alternate circulation control, the sheet interval can be reduced as compared with the normal circulation system in which the image formations on the first surface and the second surface of the first sheet P are continuously performed, and the productivity of the double-sided printing can be enhanced. Details of the sheet conveyance control in the image forming apparatus 1 will be described later.

(Sheet Ejection Device)

The sheet ejection device 30 stores sheets P ejected from the image forming apparatus main body 20 until a user collects the sheets P. The sheet ejection device 30 includes a plurality of plate-like sheet ejection trays 31. The print job sheets Pa are placed on the first sheet ejection tray 31*a* among the plurality of sheet ejection trays 31. The non-print job sheets Pb are placed on the second sheet ejection tray 31*b* among the plurality of sheet ejection trays 31.

(Controller)

The controller 40 controls the operation of each unit constituting the image forming apparatus 1. As shown in FIG. 2, the controller 40 includes a central processing unit (CPU) 41, a random access memory (RAM) 42, and a read only memory (ROM) 43.

The CPU 41 executes various kinds of arithmetic processing. Furthermore, the CPU 41 comprehensively controls the entire operation of the image forming apparatus 1. The RAM 42 provides a working memory space for the CPU 41 and stores temporary data. The ROM 43 stores various control programs to be executed by the CPU 41, setting data, and the like. Note that a rewritable nonvolatile memory such as an electrically erasable programmable read only memory (EEPROM) or a flash memory may be used instead of the ROM 43.

(External Device)

The external device 2 is, for example, a personal computer. The external device 2 supplies image data or the like of an image to be recorded by the image forming apparatus 1 to the controller 40.

[Sheet Conveyance Control; Single-Sided Printing]

Sheet conveyance control in the image forming apparatus 1 configured as described above will be described. First, the description will be limited to the case of forming an image only on the first side of the sheet P.

The controller 40 that has received the print job data from the external device 2 first conveys the sheet P from the sheet feeding device 10 to the image forming apparatus main body 20. The controller 40 causes the sheet P to be placed on the conveyance surface 221 of the conveyance section 22 and attracted by the attraction section 223. Next, the controller 40 rotates the conveyance section 22 by driving the conveyance drum motor to convey the sheet P.

As described above, the suction device 50 performs suction in a state in which the sheet P is placed on the conveyance surface 221. Then, a negative pressure is formed in the chamber 2231. The attraction section 223 thereby attracts the sheet P to the conveyance surface 221. On the other hand, immediately after the start of the print job, the formation of the negative pressure in the chamber 2231 is insufficient. Therefore, the suction pressure on the conveyance surface 221 increases. As a result, the attraction force of the attraction section 223 becomes weak, and sheet conveyance failure or printing failure due to paper floating is likely to occur.

Therefore, as shown in FIG. 5, at the start of the print job, the controller 40 causes the non-print job sheet Pb to be attracted onto the conveyance surface 221 and conveyed. The controller 40 does not operate the image forming section 23 and the fixing section 24 for the non-print job sheet Pb, and causes the non-print job sheet Pb to be delivered to the conveyance roller 25 and the belt conveyance section 26. Further, the controller 40 causes the non-print job sheet Pb to be ejected to the second sheet ejection tray 31*b* of the sheet ejection device 30 by the control of the branch portion 261 in the belt conveyance unit 26.

When the negative pressure is formed in the chamber 2231 and the suction pressure on the conveyance surface 221 becomes sufficiently low, the controller 40 causes the print job sheet Pa on which an image of the print job is formed to be conveyed.

In this way, when a predetermined condition that the attraction force by the attraction section 223 decreases is satisfied, the controller 40 causes the non-print job sheet Pb to be attracted and conveyed. Next, the print job sheet Pa is attracted to the conveyance surface 221 and conveyed, continuously to the non-print job sheet Pb. In this way, the controller 40 functions as a conveyance controller. In addition, the controller 40 functions as an image formation controller that does not perform image formation of the print job on the non-print job sheet Pb and performs image formation of the print job on the print job sheet Pa.

With the above-described configuration, the print job sheet Pa can be conveyed after the attraction section 223 has a predetermined sufficient attraction force. Therefore, printing failure caused by the attraction failure of the sheet P can be suppressed. In the above-described configuration, the non-print job paper Pb may be waste sheet. On the other hand, generation of waste sheet due to printing failure can be suppressed.

Note that FIG. 5 illustrates the case where two non-print job sheets Pb are conveyed from the start of the print job, but the present invention is not limited thereto. The number of non-print job sheets Pb to be conveyed may be one, and is appropriately and arbitrarily determined.

For example, before shipment of the image forming apparatus main body 20, the number of conveyed non-print job sheets Pb required for the attraction section 223 to have a predetermined adsorption force may be measured and stored in the ROM 43. When the conveyance control of the non-print job sheet Pb is stored in ROM 43 in this way, it is possible to shorten the preparation time when the print control is performed under the same conditions.

Alternatively, an acquisition section may be provided which acquires information on the attraction force of the attraction section 223 and transmits the acquired information to the controller 40. The acquisition section is, for example, a known pressure sensor or the like. Note that in the above-described configuration, the controller 40 may perform control such that the non-print job sheet Pb is conveyed at a timing other than the start of the print job, according to the acquired information.

The number of the non-print job sheets Pb to be conveyed may be appropriately changed according to the sheet condition of the printing job sheet Pa used in the printing job.

The sheet conditions include, for example, a paper type, a basis weight, a sheet thickness, and a sheet size.

For example, the flatness of the print job sheet Pa having low rigidity is easily collapsed by the ink. Therefore, when the rigidity of the print job sheet Pa is low, the controller 40 preferably increases the attraction force by increasing the number of the non-print job sheets Pb to be conveyed.

In addition, for example, in a case where the print job sheet Pa having a large sheet size is conveyed, it is necessary that the conveyance surface 221 attract the print job sheet Pa on the entire surface thereof. Then, it is necessary to form a sufficient negative pressure in the attraction section 223. Therefore, when the sheet size of the print job sheet Pa is large, the controller 40 preferably increases the attraction force by increasing the number of the non-print job sheets Pb to be conveyed.

[Sheet Conveyance Control; Double-Sided Printing]

Next, a case where images are formed on both sides of the print job sheet Pa will be described. As described above, the image forming apparatus 1 according to the present embodiment performs double-sided printing by so-called alternate circulation control.

Figure 6C:
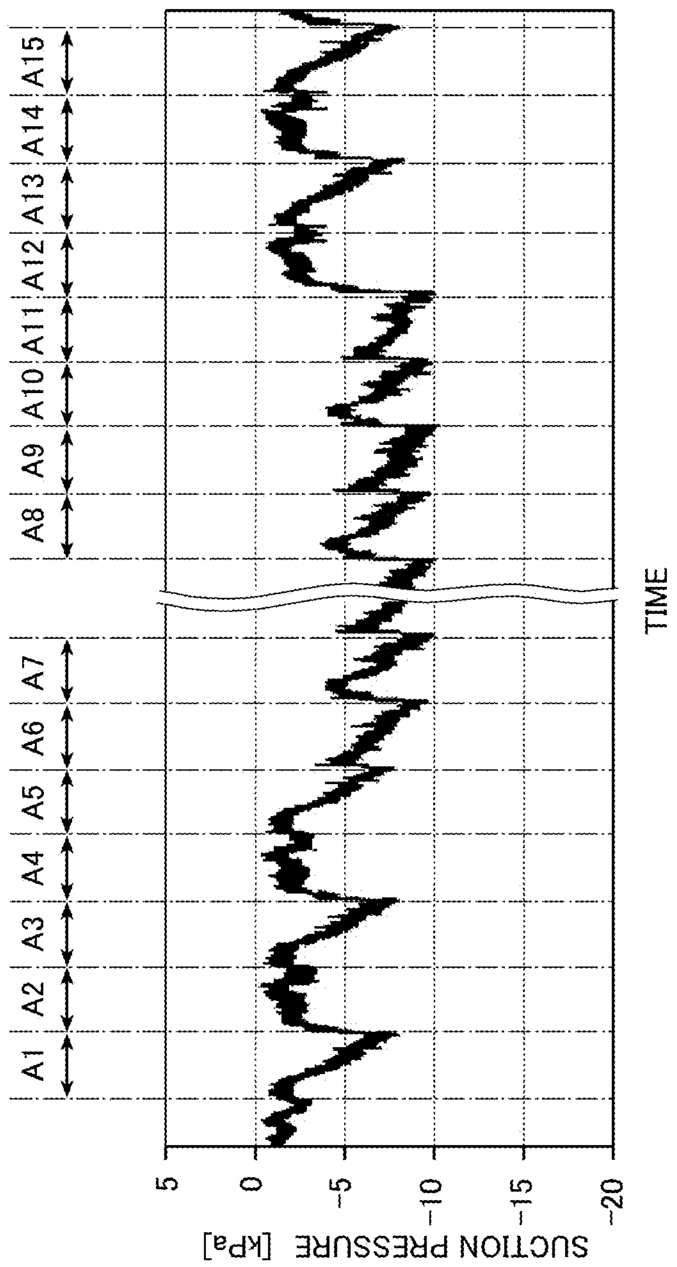
FIG. 6C is a graph showing suction pressure of each conveyance surface at each timing of FIGS. 6A and 6B.

FIG. 6A is a table listing the sheets P placed on the respective conveyance surfaces 221 from the start of a print job in a conventional image forming apparatus 1. FIG. 6B is a table listing sheets P to be conveyed before the end of a print job in the conventional image forming apparatus 1. Furthermore, FIG. 6C is a graph showing suction pressure of the respective conveyance surfaces 221 measured at the respective timings of FIGS. 6A and 6B. Note that as shown in FIG. 6B, double-sided printing is performed on N print job sheets Pa in the following example.

In the alternate circulation control, the second surface of the flipped sheet P is placed on the conveyance surface 221 between the other two of the conveying surfaces 221 on which the first surface of the sheet P is placed. Therefore, at the start of double-sided printing, it is necessary to provide a margin for the conveyance surface 221 on which the second surface of the flipped sheet P can be placed, and as shown in FIG. 6A, the sheets P cannot be continuously placed on the consecutive conveyance surfaces 221. As a result, as indicated in A2 and A3, and A4 and A5 of FIG. 6C, the suction pressure increases on the conveyance surfaces (empty conveyance surfaces) 221 on which no sheet P is placed. In addition, the suction pressure sometimes does not completely decrease in the subsequent conveyance surface 221.

Furthermore, as shown in FIG. 6B, the sheet P is no longer conveyed at the end of double-sided printing in the alternate circulation control. Therefore, the sheets P cannot be continuously placed on the consecutive conveyance surfaces 221. As a result, as indicated by A12 and A13, and A14 and A15 of FIG. 6C, the suction pressure of the empty conveyance surfaces 221 increases. In addition, the suction pressure sometimes does not completely decrease in the subsequent conveyance surface 221.

Figure 7C:
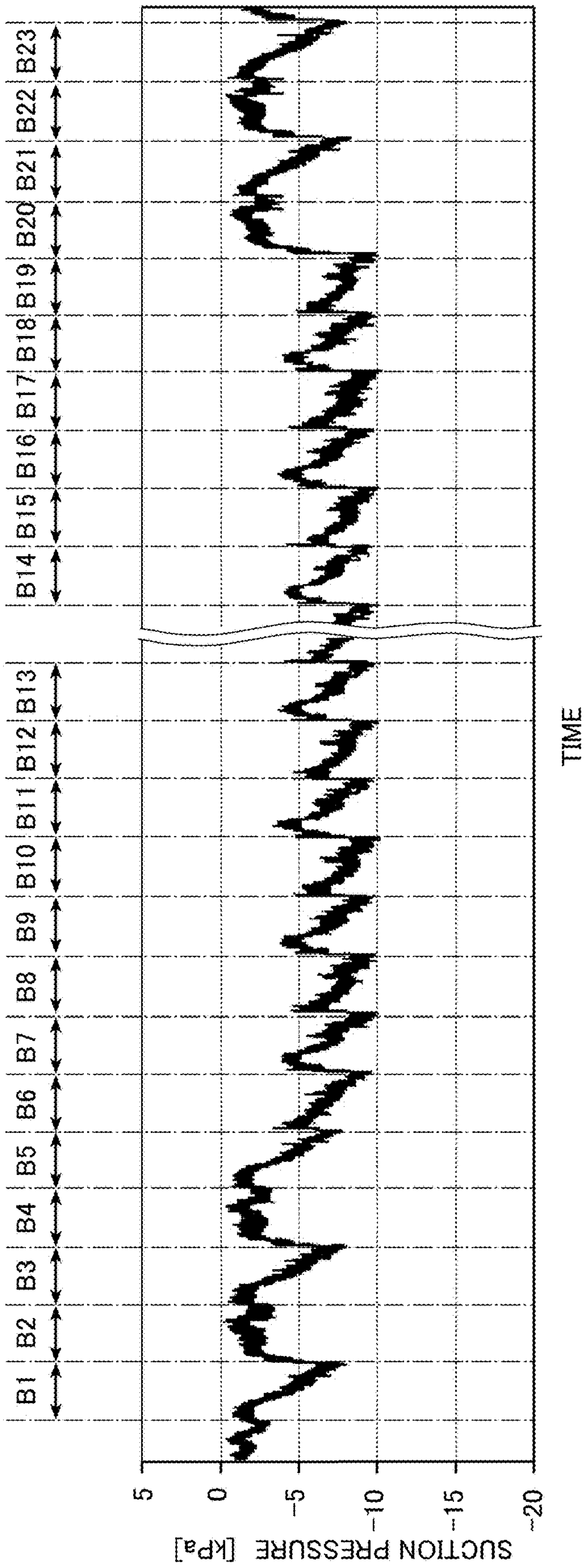
FIG. 7C is a graph showing suction pressure of each conveyance surface at each timing of FIGS. 7A and 7B.

Therefore, as shown in FIGS. 7A and 7B, the controller 40 according to the present embodiment causes the non-print job sheet Pb to be attracted and conveyed on the empty conveyance surface 221 at the timing when the empty conveyance surface 221 appears where the sheet P is not attracted on the conveyance surface 221 at the start and end of the double-sided printing. With the above-described configuration, as shown in B7 to B19 of FIG. 7C, the suction pressure on the conveyance surface 221 on which the print job sheet Pa is placed decreases sufficiently. As a result, it is possible to suppress printing failure due to attraction failure of the sheet.

In FIGS. 7A and 7B, similarly to the print job sheet Pa, the case where the non-print job sheet Pb is flipped by the conveyance roller 25 and circulated to the conveyance section 22 by the swing arm section 27 is illustrated, but the present invention is not limited thereto. That is, the controller 40 may send the non-print job sheet Pb to the belt conveyance section 26 without flipping it by the conveyance rollers 25, and eject it to the sheet ejection device 30.

FIGS. 8A and 8B are tables listing the sheets P conveyed after the start and before the end of a print job in the above-described configuration. In the above-described configuration, it is not necessary to provide a margin for the conveyance surface 221 on which the second surface of the flipped non-print job sheet Pb can be placed. Therefore, as can be seen from a comparison between FIGS. 7A and 8A in particular, a print job can be advanced in a shorter time in the above-described configuration.

On the other hand, in the above-described configuration, the controller 40 performs control such that the print job sheet Pa on which an image is formed on the first surface is sent to the swing arm section 27. Then, the controller 40 controls the conveyance roller 25 such that the print job sheet Pa on which the image is formed on the second surface and the non-print job sheet Pb are sent to the belt conveyance section 26. Therefore, the configuration of the controller 40 can be simpler in the configuration in which all the sheets P are once circulated and conveyed by the conveyance section 22.

OTHER CONFIGURATIONS

Although specific description has been given above based on the embodiment according to the present invention, the present invention is not limited to the above-described embodiment. It is a matter of course that the present invention can be subjected to various modifications including the scope of the invention described in the scope of the claims and the scope of equivalents thereof.

For example, in the above description, the non-print job sheet Pb is conveyed at the start and before the end of the print job, but the present invention is not limited thereto. For example, when the controller 40 interrupts a print job in the middle due to calibration or the like, the print job sheet Pa is not conveyed similarly to the period before the end of the print job. Therefore, the suction pressure of the conveyance surface 221 increases. Furthermore, when the print job is resumed from the interruption, the suction pressure on the conveyance surface 221 does not decrease sufficiently, similarly to the start of the print job. Therefore, when a print job is intentionally interrupted, and also when the interrupted print job is resumed, it is preferable to cause the non-print job sheet Pb to be attracted to the conveyance surface 221 and conveyed.

In FIG. 1, one sheet feed device 10 including one sheet feed tray 11 is illustrated, but the present invention is not limited thereto. For example, one sheet feed device 10 may be configured to include a plurality of sheet feed trays 11. The image forming apparatus 1 may be configured to include a plurality of sheet feed devices 10. In the above-described configuration, the print job sheets Pa and the non-print job sheets Pb may be supplied from different sheet feed trays 11. Further, the print job sheet Pa and the non-print job sheet Pb may be sheets P having different sheet conditions.

In FIG. 1, one sheet ejection device 30 including a plurality of sheet ejection trays 31 is shown as an example, but the present invention is not limited thereto. That is, the image forming apparatus 1 may be configured to include a plurality of sheet ejection devices 30.

The image forming apparatus 1 may be configured to include only one sheet ejection tray 31. In particular, in the above-described configuration, the image forming section 23 preferably forms, on the non-print job sheet Pb, a predetermined mark for distinguish the non-print job sheet Pb from the print job sheet Pa. With the above configuration, the print job sheet Pa and the non-print job sheet Pb can be easily sorted from one sheet ejection tray 31.

In addition, in the above description, a case where the conveyance surfaces 221 are provided in the specific region of the conveyance section 22 is exemplified, but the invention is not limited thereto. For example, the conveyance section 22 may be an endless belt on the entire surface of which the sheet P can be placed.

In the above description, an example in which a hard disk, a semiconductor non-volatile memory, or the like is used as a computer-readable medium for the program according to the present invention has been disclosed, but the medium is not limited to this example. As another computer-readable medium, a portable recording medium such as a CD-ROM can be applied. A carrier wave is also applied as a medium for providing data of the program according to the present invention via a communication line. Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-103954 filed on Jun. 26, 2023 is incorporated herein by reference in its entirety.

What is claimed is:

1. An image forming apparatus, comprising:

a conveyance section that includes a plurality of conveyance surfaces on each of which a sheet can be placed and that conveys the sheet placed on the conveyance surfaces;

an attraction section that attracts the sheet onto each of the conveyance surfaces by sucking air from a plurality of suction holes formed in each of the conveyance surfaces;

an image forming section that forms an image on the sheet attracted and conveyed;

a hardware processor that: when a predetermined condition causing a decrease of an attraction force by the attraction section is satisfied in executing a print job, causes one or more of the conveyance surfaces to suck and convey a non-print job sheet and then causes the one or more of the conveyance surfaces to consecutively suck and convey a print job sheet; and does not perform image formation of the print job on the non-print job sheet and performs the image formation of the print job on the print job sheet.

2. The image forming apparatus according to claim 1, wherein the predetermined condition is start of the print job.

3. The image forming apparatus according to claim 2, wherein the hardware processor determines a number of the non-print job sheet to be conveyed at start of printing, according to a sheet condition including a paper type, a basis weight, a paper thickness, and a sheet size of the printing job sheet.

4. The image forming apparatus according to claim 1, wherein the predetermined condition is when an empty conveyance surface on which no sheet is attracted appears to one or more of the conveyance surfaces during execution of the print job; and wherein the hardware processor causes the non-print job sheet to be attracted and conveyed on the empty conveyance surface.

5. The image forming apparatus according to claim 4, further comprising:

a flipping section that flips the sheet that has passed through the image forming section; and a circulation section that returns the sheet flipped by the flipping section to the conveyance section on an upstream side from the image forming section, wherein in double-sided printing the hardware processor performs image formation on a first surface of a second print job sheet between image formation on a first surface of a first print job sheet and image formation on a second surface of the first print job sheet returned to the conveyance section by the flipping section and the circulation section, and wherein the empty conveyance surface appears at start and end of the double-sided printing.

6. The image forming apparatus according to claim 5, wherein the hardware processor causes the non-print job sheet to be ejected without the non-print job sheet passing through the flipping section and the circulation section in the double-sided printing.

7. The image forming apparatus according to claim 1, wherein the hardware processor ejects the print job sheet and the non-print job sheet to different sheet ejection destinations.

8. The image forming apparatus according to claim 1, wherein the hardware processor adds a marker to the non-print job sheet for distinguishing the non-print job sheet from the print job sheet.

9. The image forming apparatus according to claim 1, wherein the predetermined condition is interruption of the print job and resumption of the interrupted print job.

10. The image forming apparatus according to claim 1, further comprising:

an acquisition section that acquires information related to a suction pressure of the suction section, wherein the predetermined condition is that the suction pressure is a predetermined value or more.

11. The image forming apparatus according to claim 1, wherein the hardware processor stores, as a print job, control to cause the non-print job sheet to be attracted to one or more of the conveyance surfaces and conveyed.

12. The image forming apparatus according to claim 1, wherein the print job sheet and the non-print job sheet have a same sheet condition including a paper type, a basis weight, a paper thickness, and a sheet size.

13. The image forming apparatus according to claim 1, wherein the conveyance surface is provided in a specific region of the conveyance section.

14. The image forming apparatus according to claim 1, wherein the hardware processor causes the non-print job sheet to be conveyed without causing the image forming section to perform the print job and performs the image formation by causing the image forming section to perform the image formation of the print job on the print job sheet while the print job sheet is conveyed by the conveyance section.

15. A non-transitory computer-readable recording medium storing a program for a computer of an image forming apparatus, wherein the image forming apparatus includes:

a conveyance section that includes a plurality of conveyance surfaces on each of which a sheet can be placed and that conveys the sheet placed on the conveyance surfaces;

an attraction section that attracts the sheet onto each of the conveyance surfaces by sucking air from a plurality of suction holes formed in each of the conveyance surfaces; and an image forming section that forms an image on the sheet attracted and conveyed, wherein the program causes the computer of the image forming apparatus:

to cause, when a predetermined condition causing a decrease of an attraction force by the attraction section is satisfied in executing a print job, one or more of the conveyance surfaces to suck and convey a non-print job sheet and then cause the one or more of the conveyance surfaces to consecutively suck and convey a print job sheet; and not to perform image formation of the print job on the non-print job sheet and performs the image formation of the print job on the print job sheet.

* * * * *